(12) United States Patent
Udagawa et al.

(10) Patent No.: US 7,141,105 B2
(45) Date of Patent: Nov. 28, 2006

(54) WATER-BASED FLUORESCENT INK, RECORDED IMAGE USING THE SAME, AND JUDGING METHOD

(75) Inventors: Masako Udagawa, Kanagawa (JP); Shoji Koike, Kanagawa (JP); Makoto Aoki, Kanagawa (JP); Akira Nagashima, Tokyo (JP); Shinichi Hakamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/975,396

(22) Filed: Oct. 29, 2004

(65) Prior Publication Data

US 2005/0109952 A1    May 26, 2005

Related U.S. Application Data

(63) Continuation of application No. PCT/JP03/08102, filed on Jun. 26, 2003.

(30) Foreign Application Priority Data

May 2, 2003    (JP) .............................. 2003-127617

(51) Int. Cl.
     *C09D 11/02*      (2006.01)
(52) U.S. Cl. ................. 106/31.49; 106/31.52; 106/31.78; 106/31.81; 106/31.32
(58) Field of Classification Search ............ 106/31.49, 106/31.52, 31.78, 31.81
See application file for complete search history.

(56) References Cited

U.S. PATENT DOCUMENTS

| | | | | |
|---|---|---|---|---|
| 4,186,020 A | * | 1/1980 | Wachtel | 523/161 |
| 4,313,124 A | | 1/1982 | Hara | 346/140 R |
| 4,345,262 A | | 8/1982 | Shirato et al. | 346/140 R |
| 4,459,600 A | | 7/1984 | Sato et al. | 346/140 R |
| 4,463,359 A | | 7/1984 | Ayata et al. | 346/1.1 |
| 4,557,761 A | | 12/1985 | Kobayashi et al. | 106/22 |
| 4,558,333 A | | 12/1985 | Sugitani et al. | 346/140 R |
| 4,608,577 A | | 8/1986 | Hori | 346/140 R |
| 4,632,703 A | | 12/1986 | Koike et al. | 106/22 |
| 4,661,158 A | | 4/1987 | Kobayashi et al. | 106/22 |
| 4,664,711 A | * | 5/1987 | Kawaguchi et al. | 524/399 |
| 4,689,078 A | | 8/1987 | Koike et al. | 106/22 |
| 4,702,742 A | | 10/1987 | Iwata et al. | 8/495 |
| 4,723,129 A | | 2/1988 | Endo et al. | 346/1.1 |

(Continued)

FOREIGN PATENT DOCUMENTS

JP      54-56847      5/1979

(Continued)

*Primary Examiner*—Jerry A. Lorengo
*Assistant Examiner*—Veronica Faison-Gee
(74) *Attorney, Agent, or Firm*—Fitzpatrick, Cella, Harper & Scinto

(57) ABSTRACT

The present invention relates to a water-based fluorescent ink for the purpose of measurement or judgment of the fluorescence emission in a visible light region by an excitation wavelength in a predetermined ultraviolet range, containing water, a coloring material dissolved or dispersed in water, and an organic solvent, having a plurality of fluorescent groups in the coloring material structure of the coloring material, and using a water-soluble coloring material having a sulfonic acid group as the water-soluble group in the state of a free acid, capable of improving the water resistance and the light resistance, dramatically increasing the content of the fluorescent coloring material in the ink, which has conventionally been included only by a small amount in the ink due to the concentration quenching problem, obtaining preferable fluorescence emission and water resistance of the recorded image, and providing preferable adhesion resistance to the recording medium of the coloring material and reliability.

15 Claims, 3 Drawing Sheets

U.S. PATENT DOCUMENTS

| | | |
|---|---|---|
| 4,725,849 A | 2/1988 | Koike et al. ................. 346/1.1 |
| 4,740,796 A | 4/1988 | Endo et al. .................. 346/1.1 |
| 4,838,938 A | 6/1989 | Tomida et al. ............... 106/22 |
| 4,849,770 A | 7/1989 | Koike et al. ................. 346/1.1 |
| 4,853,036 A | 8/1989 | Koike et al. .................. 106/20 |
| 4,923,515 A | 5/1990 | Koike et al. .................. 106/22 |
| 4,957,553 A | 9/1990 | Koike et al. .................. 106/20 |
| 4,965,612 A | 10/1990 | Sakaki et al. ................ 346/1.1 |
| 4,969,951 A | 11/1990 | Koike et al. .................. 106/22 |
| 5,017,227 A | 5/1991 | Koike et al. .................. 106/22 |
| 5,053,078 A | 10/1991 | Koike et al. .................. 106/22 |
| 5,067,980 A | 11/1991 | Koike et al. .................. 106/22 |
| 5,075,699 A | 12/1991 | Koike et al. ................. 346/1.1 |
| 5,078,790 A | 1/1992 | Tochihara et al. ............ 106/20 |
| 5,080,716 A | 1/1992 | Aoki et al. ................... 106/20 |
| 5,099,255 A | 3/1992 | Koike et al. ................. 346/1.1 |
| 5,101,217 A | 3/1992 | Iwata et al. .................. 346/1.1 |
| 5,118,351 A | 6/1992 | Shirota et al. ................ 106/22 |
| 5,124,718 A | 6/1992 | Koike et al. ................. 346/1.1 |
| 5,131,949 A | 7/1992 | Tochihara et al. ............ 106/20 |
| 5,132,700 A | 7/1992 | Tochihara et al. ............ 346/1.1 |
| 5,141,558 A | 8/1992 | Shirota et al. ................ 106/22 |
| 5,151,128 A | 9/1992 | Fukushima et al. .......... 106/20 |
| 5,190,581 A | 3/1993 | Fukushima et al. ....... 106/20 D |
| 5,213,613 A | 5/1993 | Nagashima et al. ...... 106/20 R |
| 5,220,347 A | 6/1993 | Fukushima et al. ......... 346/1.1 |
| 5,221,333 A | 6/1993 | Shirota et al. ............. 106/20 D |
| 5,248,991 A | 9/1993 | Shirota et al. ................ 346/1.1 |
| 5,250,121 A | 10/1993 | Yamamoto et al. ....... 106/22 R |
| 5,254,157 A | 10/1993 | Koike et al. .............. 106/20 D |
| 5,257,036 A | 10/1993 | Koike et al. ................. 346/1.1 |
| 5,258,066 A | 11/1993 | Kobayashi et al. ....... 106/22 R |
| 5,296,022 A | 3/1994 | Kobayashi et al. ....... 106/20 D |
| 5,329,305 A | 7/1994 | Fukushima et al. ........... 347/95 |
| 5,358,558 A | 10/1994 | Yamamoto et al. ....... 106/22 R |
| 5,380,358 A | 1/1995 | Aoki et al. ................ 106/20 R |
| 5,396,275 A | 3/1995 | Koike et al. ................. 347/101 |
| 5,409,529 A | 4/1995 | Nagashima et al. ...... 106/22 H |
| 5,439,515 A | 8/1995 | Kurabayashi et al. ..... 106/20 R |
| 5,451,251 A | 9/1995 | Mafune et al. ............ 106/22 H |
| 5,468,553 A | 11/1995 | Koike et al. .................. 428/224 |
| 5,478,383 A | 12/1995 | Nagashima et al. ...... 106/22 H |
| 5,482,545 A | 1/1996 | Aoki et al. ................ 106/22 K |
| 5,494,733 A | 2/1996 | Koike et al. .................. 428/224 |
| 5,500,023 A | 3/1996 | Koike et al. ..................... 8/499 |
| 5,515,093 A | 5/1996 | Haruta et al. ................ 347/101 |
| 5,540,764 A | 7/1996 | Haruta et al. ............. 106/20 R |
| 5,571,313 A | 11/1996 | Mafune et al. ............ 106/22 H |
| 5,594,485 A | 1/1997 | Koike et al. ................. 347/101 |
| 5,623,294 A | 4/1997 | Takizawa et al. ............. 347/98 |
| 5,645,631 A | 7/1997 | Koike et al. ............. 106/31.36 |
| 5,658,376 A | 8/1997 | Noguchi et al. ......... 106/31.43 |
| 5,665,871 A * | 9/1997 | Pedrazzi ..................... 534/573 |
| 5,686,951 A | 11/1997 | Koike et al. ................. 347/106 |
| 5,698,478 A | 12/1997 | Yamamoto et al. ......... 442/153 |
| 5,718,793 A | 2/1998 | Inamoto et al. ............. 156/235 |
| 5,733,363 A | 3/1998 | Nagashima et al. ...... 106/31.43 |
| 5,764,261 A | 6/1998 | Koike et al. ................. 347/100 |
| 5,781,216 A | 7/1998 | Haruta et al. ................ 347/106 |
| 5,782,967 A | 7/1998 | Shirota et al. ............ 106/31.58 |
| 5,865,883 A | 2/1999 | Teraoka et al. ........... 106/31.32 |
| 5,867,197 A | 2/1999 | Aoki .......................... 347/106 |
| 5,902,387 A | 5/1999 | Suzuki et al. ............. 106/22 R |
| 5,922,625 A | 7/1999 | Haruta et al. .................. 442/75 |
| 5,936,649 A | 8/1999 | Ikeda et al. .................... 347/87 |
| 5,976,673 A | 11/1999 | Aoki ............................ 428/195 |
| 6,007,182 A | 12/1999 | Matsubara et al. ........... 347/43 |
| 6,033,066 A | 3/2000 | Koike et al. ................. 347/101 |
| 6,036,307 A | 3/2000 | Hakamada et al. ......... 347/106 |
| 6,139,939 A | 10/2000 | Haruta et al. ................ 428/195 |
| 6,186,615 B1 | 2/2001 | Sato et al. ...................... 347/43 |
| 6,203,888 B1 | 3/2001 | Aoki ............................ 428/195 |
| 6,214,963 B1 | 4/2001 | Noguchi et al. ............... 528/71 |
| 6,224,204 B1 | 5/2001 | Aoki ............................ 347/106 |
| 6,394,597 B1 | 5/2002 | Koike et al. ................. 347/106 |
| 6,398,355 B1 | 6/2002 | Shirota et al. ............... 347/100 |
| 6,425,948 B1 * | 7/2002 | Nowak et al. ............ 106/31.15 |
| 6,426,766 B1 | 7/2002 | Shirota et al. ............... 347/106 |
| 6,474,803 B1 | 11/2002 | Shirota et al. ............... 347/100 |
| 6,552,156 B1 | 4/2003 | Noguchi et al. ............... 528/71 |
| 6,613,821 B1 | 9/2003 | Suzuki et al. ................ 524/111 |
| 6,619,791 B1 | 9/2003 | Tochihara et al. .......... 347/100 |
| 6,676,254 B1 | 1/2004 | Nagashima et al. ........ 347/100 |
| 6,698,876 B1 * | 3/2004 | Sato et al. .................... 347/100 |
| 6,723,137 B1 | 4/2004 | Hakamada et al. ............ 8/549 |
| 6,946,023 B1 * | 9/2005 | Mammen et al. ........ 106/31.15 |
| 2002/0195586 A1* | 12/2002 | Auslander et al. ..... 252/301.16 |
| 2003/0071883 A1 | 4/2003 | Suzuki et al. ................ 347/100 |
| 2003/0081086 A1 | 5/2003 | Suzuki et al. .................. 347/86 |
| 2003/0109600 A1 | 6/2003 | Shirota et al. ............... 523/160 |
| 2004/0104986 A1 | 6/2004 | Nito et al. ...................... 347/96 |
| 2004/0119800 A1 | 6/2004 | Takada et al. ................. 347/96 |
| 2004/0125185 A1 | 7/2004 | Takada et al. ............... 347/100 |
| 2004/0231554 A1* | 11/2004 | Udagawa et al. ......... 106/31.15 |

FOREIGN PATENT DOCUMENTS

| | | |
|---|---|---|
| JP | 59-123670 | 7/1984 |
| JP | 59-138461 | 8/1984 |
| JP | 60-71260 | 4/1985 |
| JP | 8-53640 | 2/1996 |

* cited by examiner

WATER-BASED FLUORESCENT INK, RECORDED IMAGE USING THE SAME, AND JUDGING METHOD

This application is a continuation of International Application No. PCT/JP03/08102, filed on Jun. 26, 2003, which claims the benefit of Japanese Patent Application No. 2003-127617, filed on May 2, 2003.

BACKGROUND OF THE INVENTION

1. Field of the Invention

The present invention relates to a water-based fluorescent ink for providing fluorescence emission for the purpose of measurement or judgment in a visible light region. More specifically, the present invention relates to a water-based fluorescent ink that enables visual recognition of a recorded image under UV light irradiation but not under ordinary visible light, a water-based fluorescent ink that fluoresces under UV light but not under ordinary visible light, and an authenticity judging method using the above-mentioned ink.

2. Related Background Art

Recently, various characteristics are required water-based ink for further various applications, in addition to the conventional coloring purpose for recording an image such as characters, graphics, or the like on a recording material. In particular, use of an ink containing a fluorescence emitting component is applied not only for improving the visual color saturation of an obtained image, but also for amusement, and the purpose of the identification and classification, security, or the like. Water-based inks for various applications are now required. Such applications include, not only the formation of a beautiful color image, but also development of the technique for recording information such as characters, numbers, marks, and bar codes on a recording medium with a fluorescent ink that emits colored fluorescence under irradiation of ultraviolet light of an appropriate wavelength to provide information, e.g., security information, other than ordinary visual information. In particular, in a system for authenticity judgment (forgery prevention) or security information, a device reads intensity of fluorescence emitted from a fluorescent coloring material under irradiation of light of a reference wavelength (reference excitation wavelength, for example, 254 nm) for judgment or measurement.

Heretofore, various water-based fluorescent inks for the above-mentioned application have been proposed, discussed and reported to improve the water resistance and color properties including the fluorescence of the recorded image. Since a water-based ink can contain a water-soluble fluorescent material only in a small amount because of the concentration quenching phenomenon (a phenomenon that the fluorescence decreases as the content of the coloring material in the ink increase), it is difficult to enhance the fluorescence intensity. Moreover, conventional fluorescent inks contain a coloring material having a good dissolving property to prevent aggregation and association to obtain stronger fluorescent intensity, resulting in poor water resistance of the image.

On the other hand, when a compound that forms a salt with an aqueous fluorescent coloring material, e.g., a cationic compound that forms a salt with an acidic dye, is used to improve the water resistance, the water resistance is improved but the fluorescent property is deteriorated drastically.

To cope with this problem, Japanese Patent Application Publication No. H8-053640, for instance, proposes a water-based fluorescent ink containing an aqueous fluorescent dye in an emulsion or in capsuled form, whereby the water resistance is improved dramatically in comparison with conventional water-based fluorescent inks, and, even when the content of the emulsion or capsules containing the aqueous fluorescent dye in the ink is increased, aggregation or association of the aqueous fluorescent dye would not occur, and thus the fluorescent property can hardly be deteriorated. However, when the water or solvent content in the ink decreases, the ink is subject to thickening leading to insufficient sticking resistance. Moreover, when it is used for the ink jet recording method, the sticking resistance in the nozzle is insufficient. In the worst case, the nozzle is blocked with the ink. Furthermore, with the thermal ink jet recording method, koga deposits on the heater surface so that the ejection reliability is deteriorated drastically.

SUMMARY OF THE INVENTION

The present invention is to solve the above-mentioned problems of concentration quenching and water resistance. More specifically, the object of the present invention is to provide a water-based ink that can improve both fluorescence properties and water resistance of the image, which has been difficult with conventional fluorescent coloring materials, and can contain a large amount of a fluorescent coloring material, and in addition, can have improved sticking resistance and reliability. The present invention also provides a recorded image and a judging method using the above-mentioned ink.

The above-mentioned object can be achieved by the following embodiments.

1. One aspect of the present invention is a water-based fluorescent ink to be used for measurement or judgment of a fluorescence in a visible light region that is emitted by irradiation of an excitation light of a predetermined excitation wavelength in an ultraviolet region, which ink comprises water, a coloring material that dissolves or disperses in water, and an organic solvent, wherein the coloring material has a plurality of fluorescent groups and a sulfonic acid group as a water-soluble group in a structure thereof in the state of a free acid.

2. Another aspect of the present invention is a water-based fluorescent ink to be used for measurement or judgment of a fluorescence in a visible light region emitted by irradiation of an excitation light of a predetermined excitation wavelength in an ultraviolet region, which ink comprises water, a coloring material that dissolves or disperses in water, and an organic solvent, wherein the coloring material has a plurality of fluorescent groups and a sulfonic acid group as a water-soluble group in a structure thereof in the state of a free acid, and wherein the ink is visible under an ordinary light in a visible light region.

3. Still another aspect of the present invention is a recorded image formed with a water-based fluorescent ink to be used for measurement or judgment of a fluorescence in a visible light region that is emitted by irradiation of an excitation light of a predetermined excitation wavelength in an ultraviolet region, wherein the ink comprises water, a coloring material that dissolves or disperses in water, and an organic solvent, and wherein the coloring material has a plurality of fluorescent groups and a sulfonic acid group as a water-soluble group in a structure thereof in the state of a free acid.

4. Still another aspect of the present invention is a method for judging authenticity of an ink which comprises a step of irradiating an ultraviolet ray to an image formed with a water-based fluorescent ink, wherein the water-based fluorescent ink emits a fluorescence in a visible light region by irradiation of an excitation light of a predetermined excitation wavelength in an ultraviolet region, and wherein the ink comprises water, a coloring material that dissolves or disperses in water, and an organic solvent, wherein the coloring material has a plurality of fluorescent groups and a sulfonic acid group as a water-soluble group in a structure thereof in the state of a free acid.

5. Still another aspect of the present invention is a method for judging authenticity of an image which comprises a step of irradiating an ultraviolet ray to an image formed with a water-based fluorescent ink, wherein the water-based fluorescent ink emits a fluorescence in a visible light region by irradiation of an excitation light of a predetermined excitation wavelength in an ultraviolet region, and wherein the ink comprises water, a coloring material that dissolves or disperses in water, and an organic solvent, wherein the coloring material has a plurality of fluorescent groups and a sulfonic acid group as a water-soluble group in a structure thereof in the state of a free acid.

DESCRIPTION OF THE PREFERRED EMBODIMENTS

Figure 1:
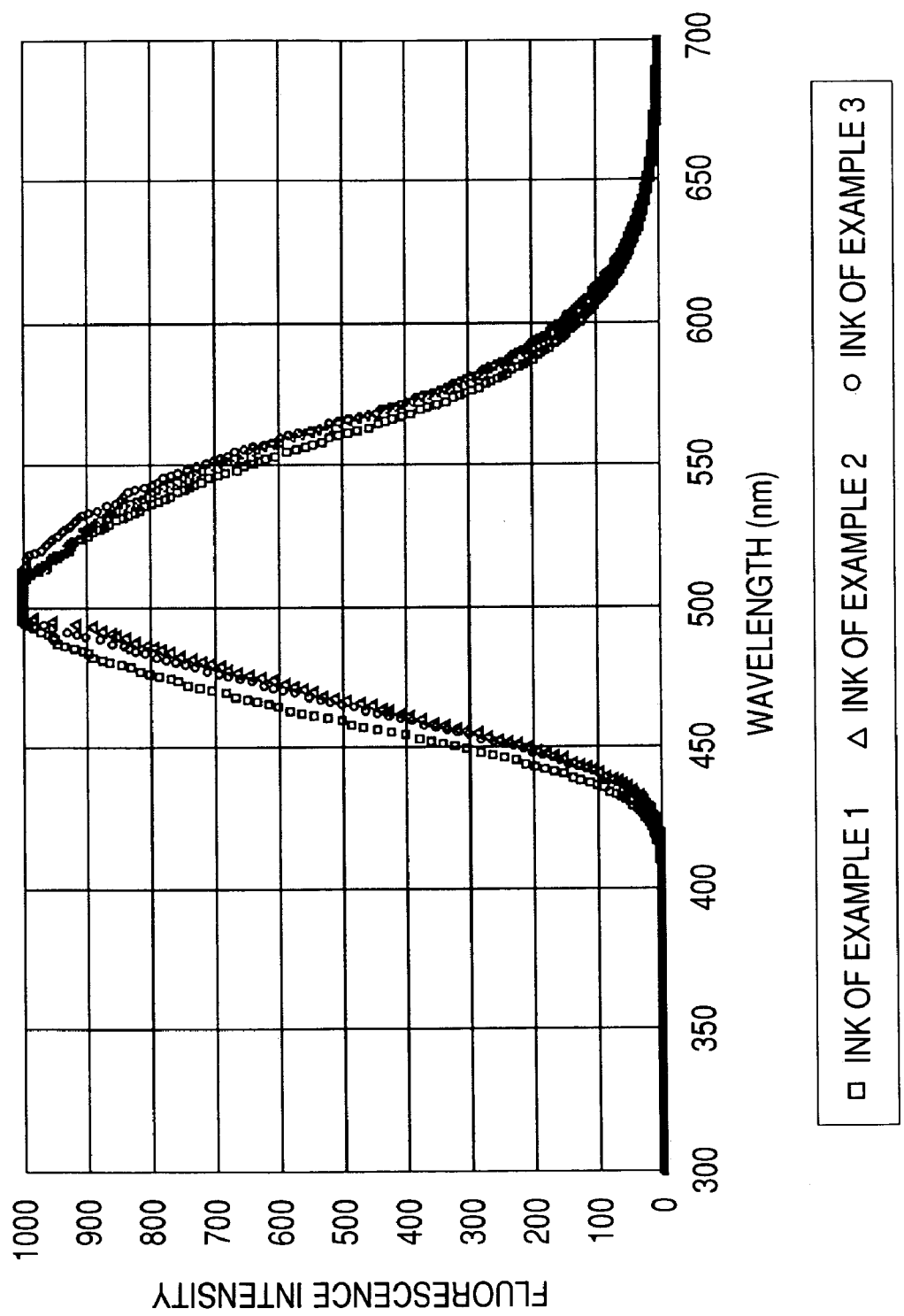
FIG. 1 is a graph showing the fluorescence intensity when inks of Examples 1 to 3 left at 60° C. are excited at an excitation wavelength of 254 nm.

Next, with reference to the preferable embodiments of the invention, the present invention will be explained in further details. First, the predicted mechanism of the inks of the present invention will be explained.

In general, the conventional water-based fluorescent ink using a monomer water-soluble fluorescent dye cannot contain the dye in a large amount because of the so-called concentration quenching, a phenomenon that the fluorescent intensity decreases as the dye concentration in the ink increases due to the dye association or aggregation. Also, conventional ink uses a highly soluble dye to obtain good fluorescent properties, so that the water resistance of the conventional ink is not satisfactory.

In contrast, the ink of the present invention solves these problems by using a coloring material having a plurality of fluorescent groups and a sulfonic acid group as the water-soluble group.

That is, since the coloring material used in the present invention has a plurality of fluorescence-emitting groups (fluorescent luminophores) in the structure, and a sulfonic acid group as the water-soluble group, the coloring material is hardly in an associated state in the ink. Furthermore, the ink can contain the coloring material in a larger amount and a plurality of the fluorescent groups do not cause the association state that decrease fluorescence. That is, since the association with regularity is hard to occur and at least part of the fluorescent groups function, the fluorescent property is hardly affected.

In particular, when the fluorescent group has a water-soluble group, particularly a sulfonic group, the water molecules gather around the fluorescent groups resulting in good fluorescence, and thus it is preferable. Moreover, since water molecules gather around the sulfonic groups, the sticking resistance of the ink is improved.

Furthermore, when the above-mentioned ink is applied onto a recording material for recording to dye the components of the recording material, the fluorescence emission is hardly be lowered so that a preferable fluorescent image can be obtained from the same reason as mentioned above.

Moreover, when the coloring material included in the ink of the present invention is hardly water-soluble, the image formed on the recording material can have good water resistance. Furthermore, when an organic solvent that can dissolve the coloring material more than water does is used for the ink of the present invention, fluorescence is enhanced because when the ink is applied to a recording material such as a commercial bond paper, the surface of the cellulose fiber is wetted with the organic solvent containing the colorant to achieve good dyeing conditions, i.e., dyeing in a monomolecular state. In this case, when the solubility of the coloring material in water is less than 3% by mass at an ordinary temperature, the effect of the present invention becomes more conspicuous. Furthermore, when the solubility of the coloring material used in the present invention in the organic solvent is 3 wt %, higher than in water, better results can be obtained.

Moreover, when the coloring material used in the ink of the present invention has direct property, the preferable effects can be obtained in terms of the fluorescent emitting property and water resistance. It is preferable for the coloring material used for the ink of the present invention to have substantivity, because it can form hydrogen bonding more easily with the constituent of the recording material, that is, it can bind to the cellulose in a mostly monomolecular state when applied onto a commercially available bond paper. As a result, the fluorescence is improved. Further, as the coloring material becomes more insoluble in water owing to binding reaction between the coloring material and cellulose such as hydrogen bonding. the preferable water resistance can be obtained.

Moreover, it is preferable that a plurality of the fluorescent groups present in the structure of the coloring material used for the ink of the present invention are linked by a linking group.

When a plurality of the fluorescent groups linked by a linking group are present in the coloring material structure, the fluorescence hardly decreases. A linking group not having resonance, such as a triazine ring, is particularly preferable.

The fluorescent group means a group that fluoresces in the visible light region by excitation with light such as ultraviolet light.

The water-soluble coloring material used in the ink of the present invention, having a plurality of the fluorescent groups and a free sulfonic group as a water-soluble group, fluoresces when irradiated with light of a predetermined excitation wavelength, and the wavelength of the fluorescence differs from that of the excitation light. The excitation wavelength and the fluorescence wavelength include the ultraviolet region, the visible light region, the infrared light range, and the near infrared light range.

Specific examples of the basic structure of fluorescent group and linking group are shown below, but not limited thereto. The fluorescent group and linking group included in a molecule are not limited to the one kind, and as long as the effect of the present invention is satisfied, any groups can be selected and combined. Moreover, a water-soluble group, such as a hydroxyl group and a sulfonic acid group, may be present in the basic structure of the fluorescent group, as long as the fluorescent property is not influenced significantly.

The presence of the linking group can provide the coloring material with a three-dimensional structure to prevent the association between the coloring material molecules, thereby preventing decrease in fluorescence intensity owing to the concentration quenching.

Basic Structure

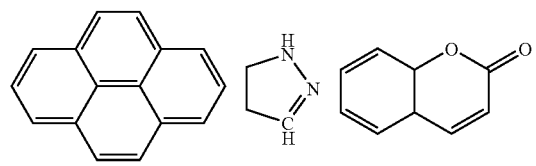
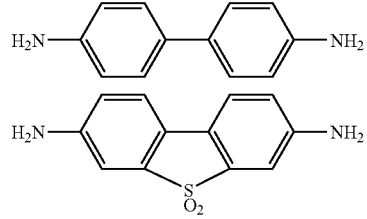
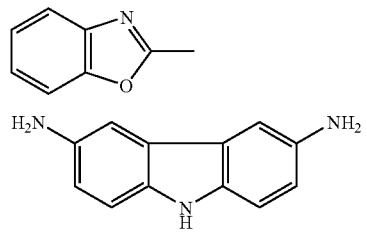
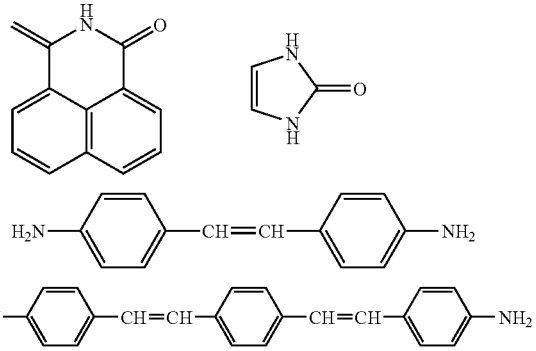
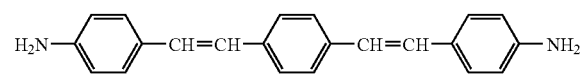

Atomic Group Including the Linking Group

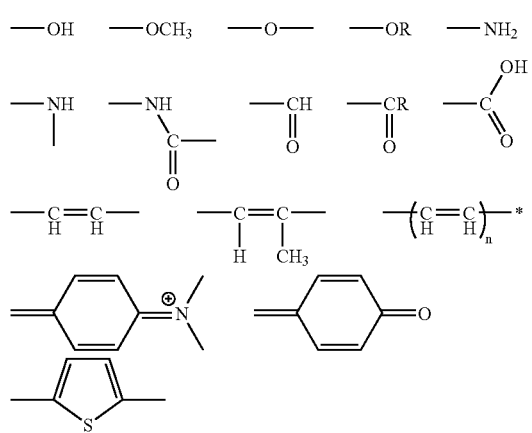

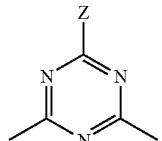

(1)

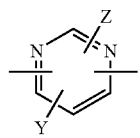

(2)

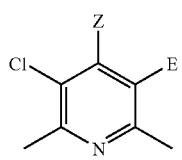

(3)

(Z in the above-mentioned formulae (1) to (3) each independently represents an $NR_1R_2$, an $SR_3$ or an $OR_3$, Y in the formula (2) represents an H, a Cl, the above-mentioned Z, an $SR_4$ or an $OR_4$, E in the formula (3) represents a Cl or a CN. $R_1$, $R_2$, $R_3$ and $R_4$ each independently represent an H, an alkyl group, a substituted alkyl group, an aryl group, a substituted aryl group, an aralkyl group, a substituted aralkyl group, or a hydroxyl group. $R_1$ and $R_2$ may form a 5- or 6-membered ring together with a nitrogen atom.

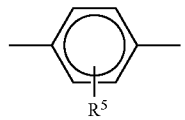

(4)

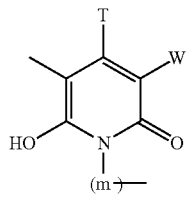

(5)

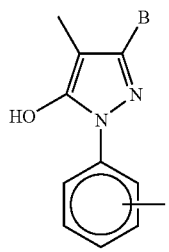

(6)

(In the above-mentioned formula (4), $R_5$ is selected independently from a hydrogen atom, an alkyl group, a substituted alkyl group, an alkoxy group, a halogen atom, a CN, a ureid group, and an $NHCOR_6$. The $R_6$ is selected from a hydrogen atom, an alkyl group, a substituted alkyl group, an aryl group, a substituted aryl group, an aralkyl group and a substituted aralkyl group. In the formula (5), T represents an alkyl group, and W is selected from a hydrogen atom, a CN, a $CONR_7R_8$, a pyridium group, and a carboxyl group. $R_7$ and $R_8$ each independently selected from a hydrogen atom, an alkyl and a substituted alkyl group. M represents an alkylene chain having 2 to 8 carbon atoms. In the formula (6), B is selected from a hydrogen atom, an alkyl group and a carboxyl group.

The specific examples of the substituents in the above general formulas can be selected according to the desired fluorescence emitting property.

Examples of the water-soluble fluorescent coloring material having a plurality of fluorescent groups and a free sulfonic acid group as the water-soluble group in the coloring material structure to be used in the present invention, which have the above-mentioned atomic groups as the basic structure and linking group, are shown below but not limited thereto.

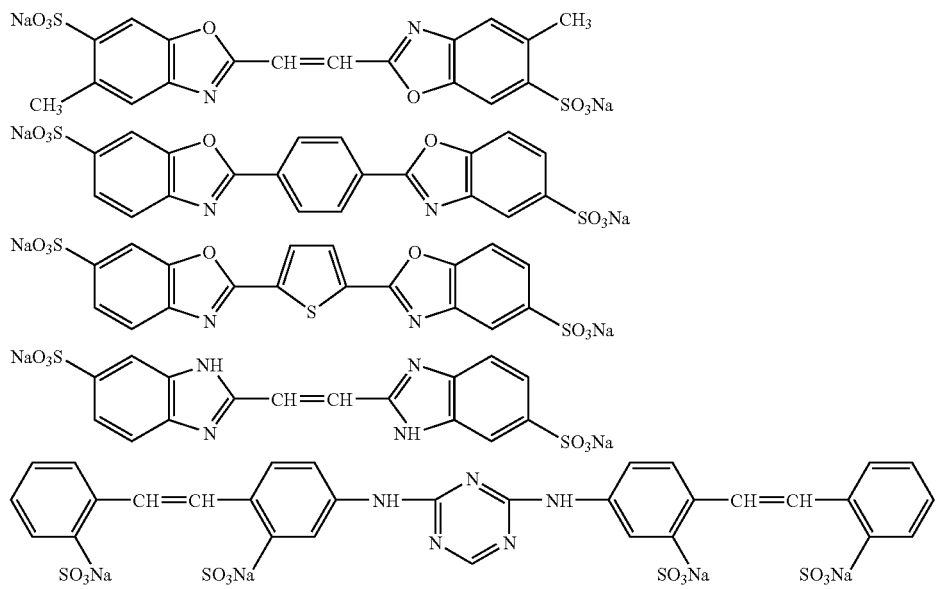

Moreover, the particularly preferable water-soluble fluorescent coloring materials having a plurality of fluorescent groups and at least one free sulfonic acid group as the water-soluble group are those having a stilbene group as the fluorescent groups. Particularly preferable ones are those having a plurality of diamino stilbene disulfonic acid structures. One preferable example of such coloring materials, which has an absorption spectrum in the visible light region and is visible, is Compound (A) shown below, but not limited thereto.

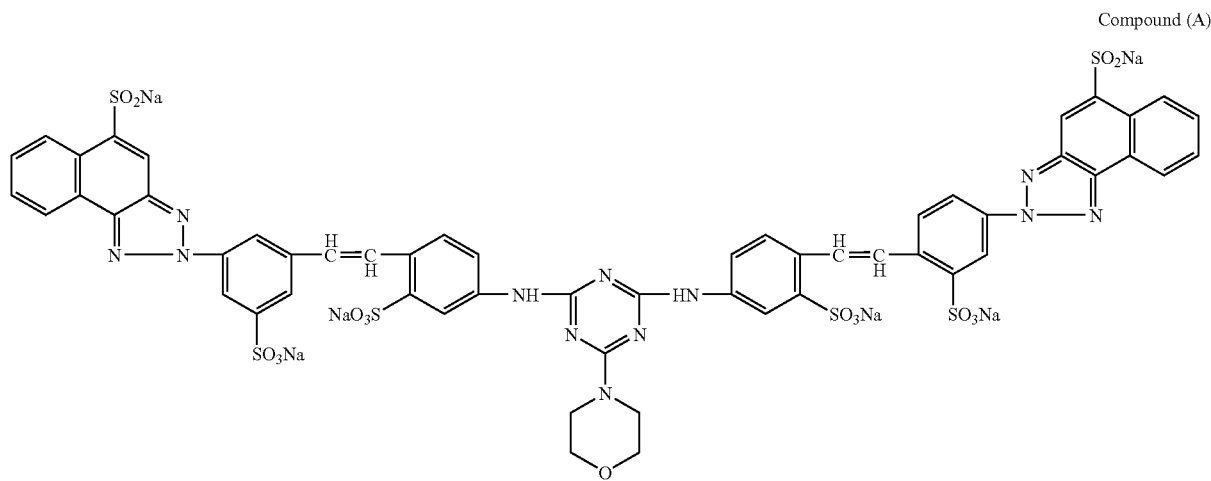

Compound (A)

The fluorescent ink of the present invention may further contain a non-fluorescent water-soluble coloring material. In conventional fluorescent ink, the presence of such a non-fluorescent water-soluble coloring material decreases the fluorescence to a great extent, and in some cases the fluorescence is quenched. The ink of the present invention can prevent such deterioration of the fluorescence emission.

The water-soluble coloring material means those having a water-soluble group such as a sulfonic acid group, a carboxylic acid group, a phosphoric acid group, a hydroxyl group, and an amino group in a free state in the structure, and capable of existing stably in water without the aid of a second component such as a surfactant and a resin. The specific examples thereof are, for example, direct dyes, acidic dyes, basic dyes, vat dyes and the like. Specifically, for example, Direct black 168, direct Black 154, Direct Yellow 142, Direct Yellow 86, direct Red 227, Direct Blue 199, Direct Yellow 142, Direct Black 195, and Food Black 1,2 can be presented, but not limited thereto. The water-soluble coloring materials can be used alone, or as needed, in combination of two or more kinds.

Moreover, depending on the cases, among the above-mentioned water-soluble coloring materials, those having a low water solubility and a pigment-like behavior may be used as the water-dispersible coloring materials. When such a coloring material is used together in the ink of the invention, the decrease in fluorescence emission is greatly alleviated.

Specific examples of the non-fluorescent coloring material having a carboxylic group as the water-soluble group include di or tris azo coloring materials of strong substantivity such as Direct black 195, Direct Black 51, or the like, and coloring materials having a dimmer structure or the linking group the following coloring materials represented by the general formulae (A) to (C) in a free acid state. According to the present invention, even when the above-mentioned coloring material coexists in the ink, the decrease in fluorescence emission can be greatly alleviated. Those capable of providing the effects of the present invention when used in combination are not limited to the above-mentioned coloring materials.

(1) Coloring Materials Represented by the Following General Formula (A) in the Form of Free Acid General Formula (A)

$$Pc(SO_3H)_t(SO_2-NR^1-L-NR^2-X-NR^3-G)_q$$

[In the general formula (A), Pc represents a metal containing phthalocyanine nucleus, and $R_1$, $R_2$ and $R_3$ each independently represent an H, an alkyl group, a substituted alkyl group, an alkenyl group, a substituted alkenyl group, an aralkyl group or a substituted aralkyl group. L represents a divalent organic linking group. X each independently represents a carbonyl group or a group represented by the following formulae (2) to (4).

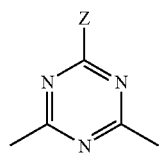
(2)

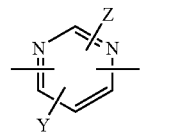
(3)

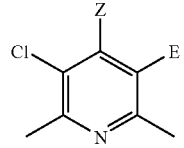
(4)

(Z in the above-mentioned formulae (2) to (4) each independently represents an $NR_4R_5$, an $SR_6$ or an $OR_6$, Y in the formula (3) represents an H, a Cl, the above-mentioned Z, an $SR_7$ or an $OR_7$, E in the formula (4) represents a Cl or a CN. $R_4$, $R_5$, $R_6$ and $R_7$ each independently represent an H, an alkyl group, a substituted alkyl group, an aryl group, a substituted aryl group, an aralkyl group, or a substituted aralkyl group. $R_4$ and $R_5$ form a 5- or 6-membered ring together with a nitrogen atom.) G represents a colorless organic residual group substituted by one or two COSH or COOH, and t+q is 3 or 4.]

As the compounds represented by the general formula (A), for example, those mentioned below can be presented.

Example color material (1)

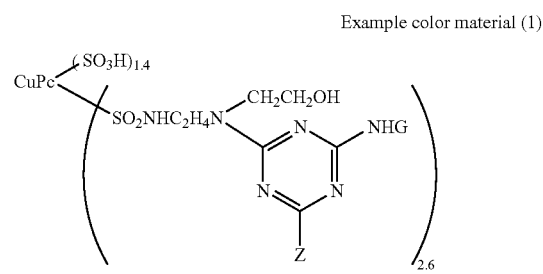

(2) Coloring Materials Represented by the Following General Formula (B) in the Form of Free Acid General formula (B)

$$Ar^1N=NJX(NR^1LNR^2X)_nJN=NAr^2$$

[In the above-mentioned general formula (B), J represents the following formula.

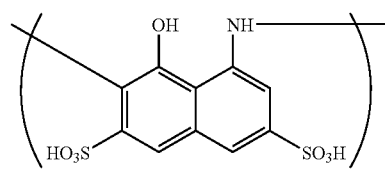

In the general formula (B), $Ar^1$ and $Ar^2$ each independently represent an aryl group or a substituted aryl group, and at least one of $Ar^1$ and $Ar^2$ each independently has at least one substituent selected from COOH and COSH. $R_1$ and $R_2$ each independently represent an H, an alkyl group, a substituted alkyl group, an alkenyl group, or a substituted alkenyl group. L represents a divalent organic linking group, and n represents 0 or 1. X each independently represents a carbonyl group or a group represented by the following formulae (2) to (4).

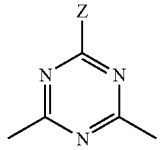
(2)

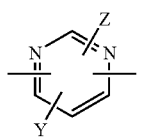
(3)

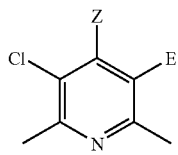
(4)

(Z in the above-mentioned formulae (2) to (4) each independently represents an $NR_3R_4$, an $SR_5$ or an $OR_5$, Y in the formula (3) each independently represents an H, a Cl, the above-mentioned Z, an $SR_6$ or an $OR_6$, E in the formula (4) represents a Cl or a CN. $R_3$, $R_4$, $R_5$, and $R_6$ each independently represent an H, an alkyl group, a substituted alkyl group, an alkenyl group, a substituted alkenyl group, an aryl group, a substituted aryl group, an aralkyl group, or a substituted aralkyl group. $R_3$ and $R_4$ form a 5- or 6-membered ring together with a nitrogen atom.) The compound represented by the general formula (B) has at least the same number of a group selected from COOH and COSH as that of $SO_3H$ group.]

As the compounds represented by the general formula (B), for example, those mentioned below can be presented.

Example color material (2)

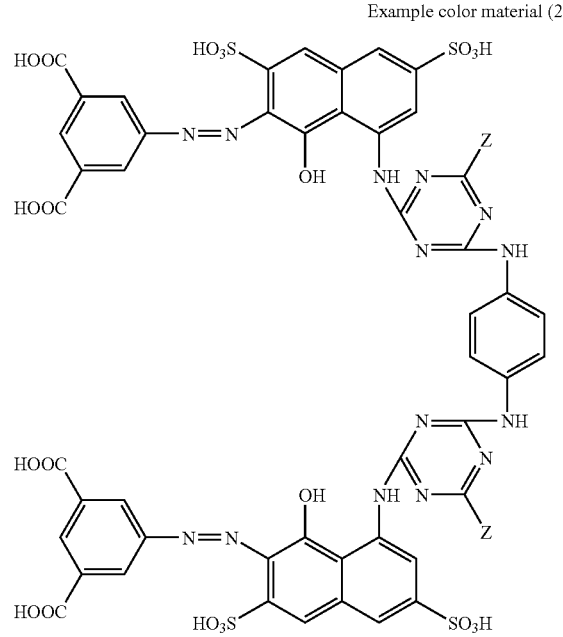

Example color material (3)

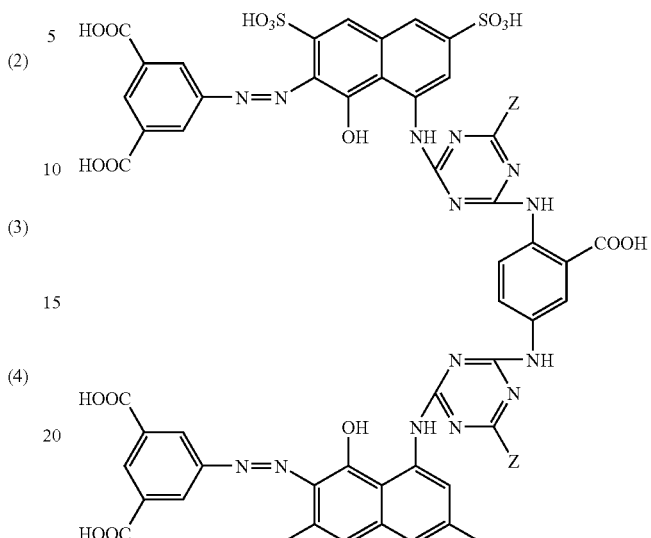

Example color material (4)

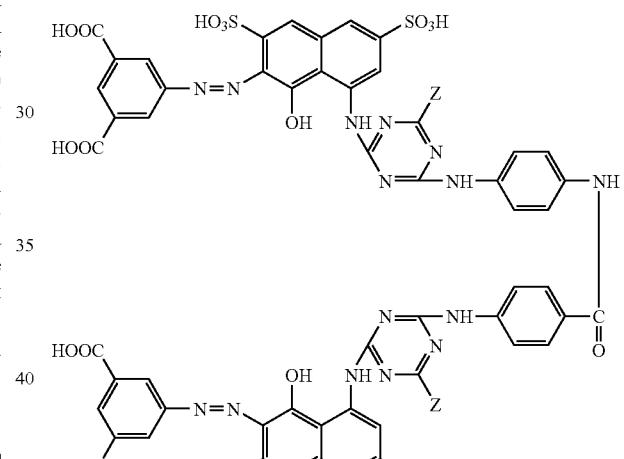

Example color material (5)

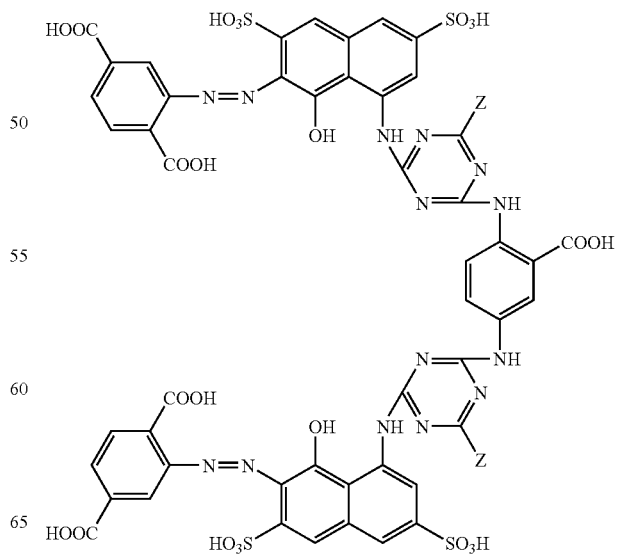

(3) Coloring Materials Represented by the Following General Formula (C) in the Form of the Free Acid

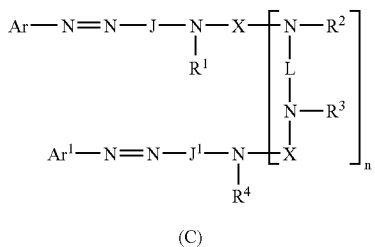

[In the above-mentioned general formula (C), Ar and $Ar^1$ each independently represent an aryl group or a substituted aryl group, and at least one of Ar and $Ar^1$ has a substituent selected from the group consisting of a sulfonic group, a carboxyl group and a thiocarboxylic group. J and J1 are each independently represented by the following formulae (2), (3) or (4).

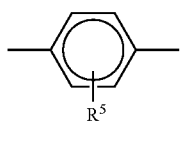

(2)

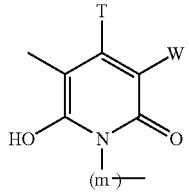

(3)

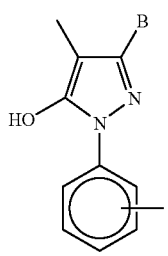

(4)

(In the above-mentioned formula (2), $R_5$ is selected from a hydrogen atom, an alkyl group, a substituted alkyl group, an alkoxy group, a halogen atom, a CN, a ureido group and an $NHCOR_6$. The $R_6$ is selected from a hydrogen atom, an alkyl group, a substituted alkyl group, an aryl group, a substituted aryl group, an aralkyl group and a substituted aralkyl group. In the formula (3), T represents an alkyl group, and W is selected from a hydrogen atom, a CN, a $CONR_{10}R_{11}$, a pyridium group, and a carboxyl group. $R_{10}$ and $R_{11}$ are each independently selected from a hydrogen atom, an alkyl and a substituted alkyl group. m represents an alkylene chain having 2 to 8 carbon atoms. In the formula (4), B is selected from a hydrogen atom, an alkyl group and a carboxyl group.

$R_1$, $R_2$, $R_3$ and $R_4$ in the formula (C) each independently is selected from a hydrogen atom, an alkyl, and a substituted alkyl group. L represents a divalent organic linking group, and n represents 0 or 1. X each independently represents a carbonyl group or it is represented by the following formulae (2), (3) or (4).

(2)

(3)

(4)

(Z in the above-mentioned formulae (2) to (4) each independently is selected from an $OR_7$, an $SR_7$ and an $NR_8R_9$, Y is selected from a hydrogen atom, a Cl, a CN and a Z, and E is selected from a Cl and a CN. $R7_7$, $R_8$ and $R_9$ each independently represent a hydrogen atom, an alkenyl group, a substituted alkenyl group, an alkyl group, a substituted alkyl group, an aryl group, a substituted aryl group, an aralkyl group, or a substituted aralkyl group. Furthermore, $R_8$ and $R_9$ may form a 5- or 6-membered ring together with a nitrogen atom bonded therewith.)

When the compound of the general formula (C) does not have a sulfonic group, it has at least two groups selected from a carboxyl group and a thiocarboxylic group, and the compound of the general formula (C) has a sulfonic group(s) or the same number of a group(s) selected from a carboxyl group and a thiocarboxylic group as that of the sulfonic group.]

As the compounds represented by the above-mentioned general formula (C), for example, those mentioned below can be presented.

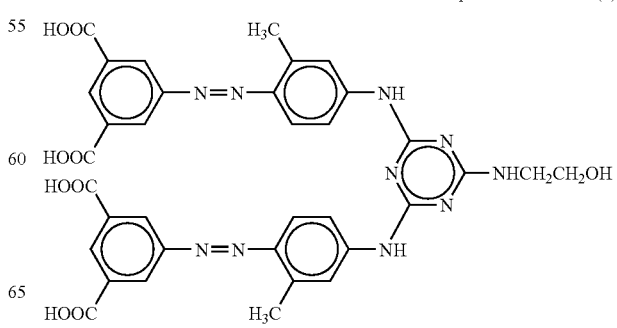

Example color material (6)

-continued

Example color material (7)

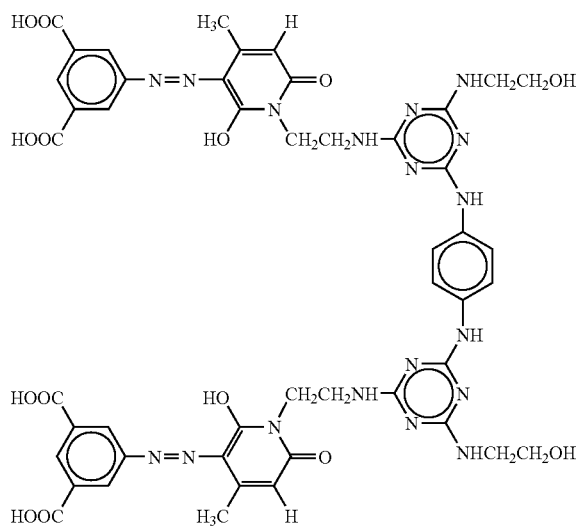

Example color material (8)

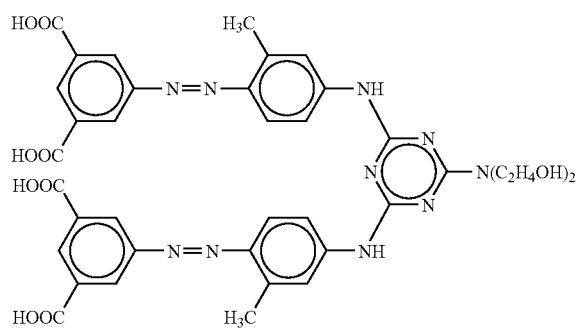

Example color material (9)

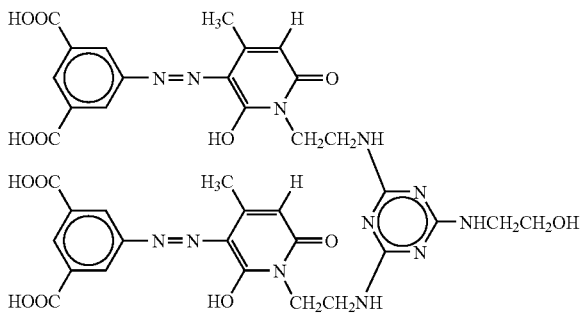

Example color material (10)

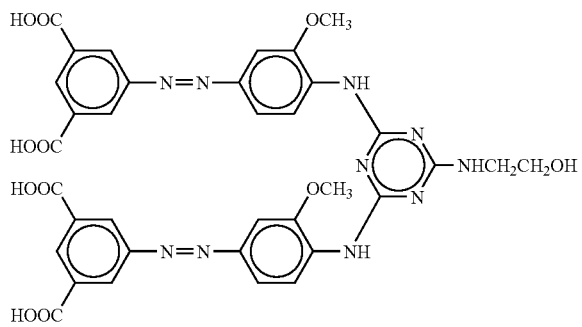

-continued

Example color material (11)

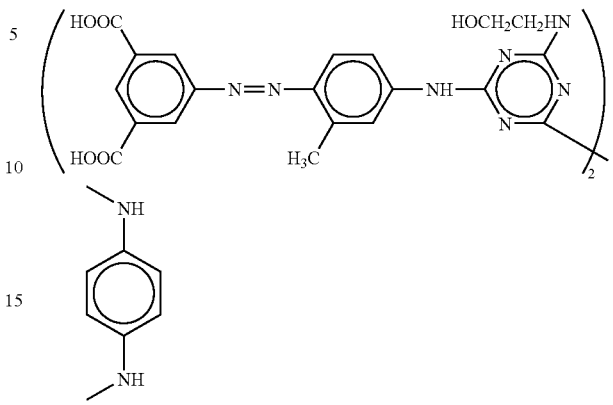

When the above-mentioned coloring materials are used in combination, the amount of the coloring material in the ink depends on the purpose and the form of the use, and thus it is not particularly limited. However, in general, it is preferable in a range of 0.1 to 15% by mass with respect to the ink total weight. More preferably, it is 0.1 to 10% by mass. At least as a part of the coloring material, the water-soluble fluorescent coloring material having a plurality of the fluorescent groups and a free sulfonic acid group as the water-soluble group of the present invention is used.

Moreover, when the above-mentioned coloring material used in combination, the ratio of the above-mentioned coloring material not having the fluorescence in the total coloring material to be used can be selected according to the characteristics of the desired fluorescence emission, and it can be at least 0.1 to 20% by mass with respect to the total coloring material amount, and it is preferably at least 0.5 to 10% by mass.

Moreover, in the present invention, when a fluorescent coloring material having a structure different from that of the present invention is used in combination to increase the content of the coloring material in the ink of the present invention, not only the decrease in the fluorescent intensity is suppressed, but also the fluorescent intensity is improved. As the fluorescent coloring material used here, either a dye and a pigment can be used, but a dye is preferable because it provides the ink with a large blurring rate on a recording medium and for obtaining higher fluorescent intensity.

According to the present invention, whether the fluorescent coloring material of the present invention is used alone as the coloring material, a plurality of the fluorescent coloring materials of the present invention are used in combination, or the coloring material of the present invention and a fluorescent coloring material outside the range of the present invention are used in combination, the total content of the coloring material is preferably 0.01 to 20% by mass with respect to the ink total mass, and furthermore, 0.05 to 10% by mass.

As the other components used in the ink, it is preferable to use a mixture of water and a water-soluble organic compound as the solvent component. As the water-soluble organic compound, for example, sugar alcohols such as glycerol and xylitol, amides such as dimethyl formamide, and dimethyl acetamide; ketones such as acetone; ethers such as tetrahydrofuran and dioxane; polyalkylene glycols such as polyethylene glycol and polypropylene glycol; alkylene glycols having an alkylene group of 2 to 6 carbon atoms such as ethylene glycol, propylene glycol, butylenes glycol, triethylene glycol, 1,2,6-hexane triol, thiodiglycol, hexylene glycol, and diethylene glycol, lower alkyl ethers of a polyhydric alcohol such as ethylene glycol mono methyl (or ethyl) ether, diethylene glycol mono methyl (or ethyl) ether, and triethylene glycol mono methyl (or ethyl) ether; N-methyl-2-pyrolidone, 1,3-dimethyl-2-imidazolydinone, triethanol amine, sulforan, dimethyl sulfoxide, 2-pyrolidone, or the like, those having the crystalline property, such as urea, ethylene urea, $\epsilon$ caprolacton, succinimide, thiourea, dimethylol urea, or the like can be presented, and one selected therefrom, or as needed, two or more kinds selected can be used.

Moreover, to these compounds, at least one selected from ethylene oxide, propylene oxide and an alkyl can be added as a substituent, to improve the fluorescence of the ink of the present invention applied on the recording material.

Moreover, it is preferable to use a crystalline compound having a cyclic structure since the crystallization of the crystal forming compound in the ink maintains sticking resistance of the ink and the stability of the image. The crystal forming component can be used alone or as needed as a combination of two or more kinds. Moreover, those being solid in an ordinary temperature environment is preferable for the effect of the present invention owing to precipitation of the crystal component. The above-mentioned ordinary temperature environment means a range of 20° C. to 25° C. In consideration of the handling convenience, those having a melting point in the ordinary temperature environment of 30° C. or more and preferably those having the melting point of 60° C. or more are preferable, and further preferably, those having the melting point of 120° C. or higher are preferable as the crystal forming component. The content of the crystal forming component in the ink can be selected according to the kind of the recording material, and it is preferably 1 to 30% by mass with respect to the ink total mass, and furthermore, 2 to 20% by mass. When it is too little, the effect of the present invention cannot be realized, and when it is too much, an adverse effect is posed to the ejecting property in the case of use for the ink jet recording.

Moreover, the content of the above-mentioned water-soluble organic compound is in general 1% to 40% by mass with respect to the ink total mass, and more preferably it is in a range of 2% to 30% by mass.

Moreover, the water content of the ink is selected preferably in a range of 30 to 95% by mass. When it is less than 30% by mass, the solubility of the water-soluble component may not be ensured, and furthermore, the ink viscosity becomes higher. In contrast, when the water content is more than 95% by mass, too much evaporating component prevents sufficient adhesion characteristics.

As the constituent component of the ink of the present invention, it is preferable to use a surfactant. As the surfactant, those of various kinds can be used, and the preferable surfactants are a surfactant having a nonionic property or an anionic property.

When it has a cationic property, not only the color developing property and the reliability are deteriorated, but also it reacts with the coloring material to be used so as to prevent appearance of the effects of the present invention. However, an amphoteric surfactant may be used depending on the state of the use. Furthermore, it is particularly preferable to use a nonionic surfactant since the nonionic surfactant does not have a polarity with respect to the coloring material so as to hardly hinder the reliability. If the surfactant has a polarity, it will deter the fluorescence emitting property of the ink.

Moreover, it is preferable that the surfactant will not cause phase separation from an aqueous solution or from an ink not containing a coloring material. If the surfactant causes phase separation, the ink becomes instable, and it tends to adsorb to the ink storage member lowering the effect of the present invention and reliability of the recording apparatus of the present invention, and thus it is not preferable.

This means that use of a surfactant that apparently dissolves or disperses homogeneously in water is preferable. Moreover, even a surfactant that causes phase separation from an aqueous solution or ink excluding the coloring material can be used in a state apparently dissolved or dispersed homogeneously in water, e.g., in an emulsion state, by concomitant use of another surfactant.

Moreover, by using the surfactant in the ink at a critical micelle concentration or more, more preferable result can be obtained. This is because with the content is equal to or higher than the critical micelle concentration, diffusion of the ink droplet on the recording material becomes preferable with most of the recording materials, so that the fluorescent coloring material tends to adsorb onto the constituent component of the recording material in a monomolecular state, that is, aggregation or association of the fluorescent coloring material can be prevented.

Moreover, surfactants having a small difference between the dynamic surface tension and the static surface tension are preferable. If the difference is small, the orientation speed of the surfactant is high accelerating wetting of the interface of the recording material with the ink droplet. Thus the effect of the present invention is improved.

Moreover, a surfactant having a poor solubility in water or ink can be used in combination with another surfactant forming composite micelles or an emulsion state in the ink or the aqueous solution for use.

Among the nonionic surfactants, those having the HLB of 15 or less can be used preferably in the present invention. This is because, although the effect of the present invention can be obtained with a surfactant having a good water solubility, the water solubility is so high if the HLB is more than 15 that the wettability or diffusing property of the ink droplet with the recording material becomes undesirable, and thus the mechanism effect of the present invention can not be realized sufficiently.

The content of the nonionic surfactant in the ink of the present invention is specifically 1% by mass or more with respect to the ink total mass, and it is further preferably 1 to 20% by mass. When it is less than 1% by mass, the desired ink permeating property and spreading property may not be obtained in the image formation. Moreover, when it is more than 20% by mass, the balance of the desired printing qualities, for example, the preferable balance of various performances such as the image density, the image fixing property, prevention of feathering (beard-like blurring) may not be kept.

Among the nonionic surfactants satisfying the above-mentioned conditions, those particularly preferable for the constituent component of the ink of the present invention include the following compounds represented by the general formula (I) and the compounds represented by the following (II) to (VII) can be presented, but not limited thereto.

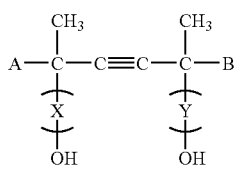

(I)

[In the above-mentioned general formula (I), A and B each independently represent $C_nH_{2n-1}$ (N is an integer from 1 to 10), and X and Y each represents an open ringed ethylene oxide unit and/or an opened propylene oxide unit.]

(R: alkyl group of a fatty acid)

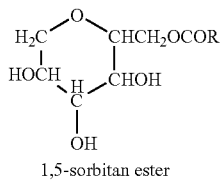

(II)

1,5-sorbitan ester

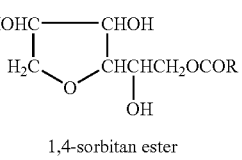

(III)

1,4-sorbitan ester

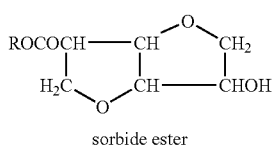

(IV)

sorbide ester

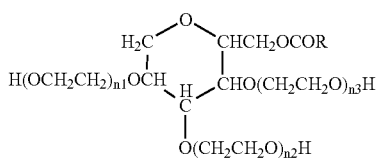

(V)

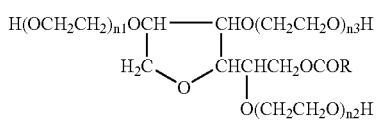

(VI)

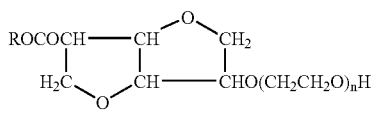

(VII)

(R: alkyl group of a fatty acid)

Moreover, among the nonionic surfactants represented by the above-mentioned general formula (I), particularly preferable are the compounds represented by the following general formula (VIII).

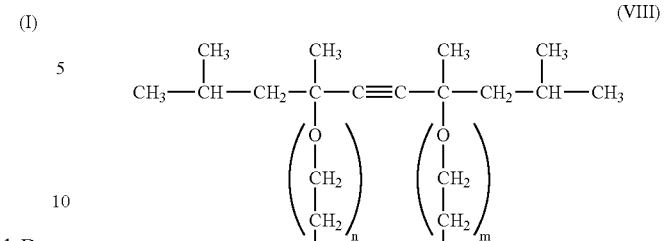

(VIII)

(m and n are an integer, respectively.)

In view of the ink stability, it is preferable that the ink of the present invention further contains a monohydric alcohol. The monohydric alcohol prevents microbial growth such as fungi that may cause clogging. Furthermore, monohydric alcohol can enhance the effects of the present invention because it accelerates evaporation or permeation of the ink applied onto a recording material. The content of the monohydric alcohol in the ink of the present invention is 0.1 to 20% by mass with respect to the total ink mass, preferably 0.5 to 10% by mass. Specific examples of the monohydric alcohol usable for the ink of the present invention include ethanol, isopropyl alcohol, n-butanol, or the like, and they can be used alone or in combination of two or more kinds as required.

As needed, the ink of the present invention may further include various kinds of additives such as a water-soluble organic solvent, a surfactant, a corrosion preventing agent, an antiseptic agent, a fungus preventing agent, an antioxidant, an antireductant, an evaporation promoting agent, a chelating agent, a water-soluble polymer, and a pH adjusting agent.

According to the present invention, the surface tension of the ink is 40 mN/m or less, and furthermore, 30 to 40 mN/m, because it is preferable for a liquid droplet to occupy a certain area after recording, in view of the mechanism expression explained above. Moreover, the pH of the ink of the present invention is preferably 6.5 or more in terms of the ink stability.

Furthermore, according to the ink of the present invention, it is preferable to use a plurality of alkali metal ion species as the counter ion for the coloring material. When the ink is used for ink jet recording, combination use of the coloring material and the alkali metal ion can improve the stability and ejection properties of the ink. As the alkaline metal ions, $Li^+$, $Na^+$, $K^+$, or the like can be listed.

As the method and the apparatus preferable for recording with the ink of the present invention, a method and an apparatus for providing thermal energy in accordance with the recording signal to the ink in the chamber of the recording head, and generating liquid droplets by the thermal energy can be presented.

Although the water-based ink of the present invention provided as mentioned above is used as an ink for the ordinary stationery, it is particularly effective at the time of use in the ink jet recording. As the ink jet recording method, there are a recording method of ejecting liquid droplets by applying a mechanical energy to the ink, and an ink jet recording method of ejecting liquid droplets by bubbling of the ink by applying a thermal energy to the ink. In particular, it is preferable for the case of use in the ink jet recording method of the type of ejecting the ink by the ink bubbling phenomenon by the thermal energy so that the characteristics of the extremely stable ejection without generation of the satellite dots, or the like can be provided. However, in this case, the thermal physical property values (such as the specific heat, the coefficient of the thermal expansion, and the coefficient of the thermal conductivity) may be adjusted.

Furthermore, in view of solving the problem of water resistance of the ink printed or recorded on plain paper, and of good matching with the ink jet head, it is preferable that the viscosity of the ink of the present invention at 25° C. is adjusted to 15 cP or less, preferably 10 cP or less, and more preferably 5 cP or less. Therefore, in order to adjust the ink to the above-mentioned physical properties for solving the problems with the plain paper, the water content included in the ink of the present invention is 50% by mass or more and 98% by mass or less, and more preferably 60% by mass or more and 95% by mass or less.

It is preferable that the present invention is used for the fluorescence emission for the purpose of the measurement or judgment in the visible light region by the excitation wavelength in the predetermined ultraviolet region. When a conventional aqueous fluorescent dye is used for an ink, the water resistance is poor and the fluorescence intensity is weak. Thus when another coloring material is mixed in the ink, desired performance cannot be obtained. On the contrary, the ink of the present invention can provide good water resistance and fluorescent intensity. Accordingly, among a number of the ink identification applications, it can be used for authenticity determination of the printed matter, for example, of securities and the like.

The present invention provides excellent effects in the ink jet recording head and recording apparatus that carry out recording by ejecting liquid droplets utilizing thermal energy.

As the representative configuration and principal thereof, for example, those using the basic principals disclosed in the specification of the U.S. Pat. No. 4,723,129, and the specification of the U.S. Pat. No. 4,740,796 are preferable. The method can be utilized either to the so-called on demand type or the continuous type. Particularly in the case of the on demand type, it is effective since the thermal energy is generated in the electro-thermal converter by applying at least one driving signal for providing the rapid temperature rise exceeding the nuclear boiling point according to the recording information to the sheet with the liquid (ink) sustained or the electro-thermal converter disposed corresponding to the liquid channel for generating the film boiling in the heater surface of the recording head so as to consequently form a bubble in the liquid (ink) according to the driving signal one by one. By ejecting the liquid (ink) via the ejection opening according to the growth and the contraction of a bubble, at least one droplet is formed. By providing the driving signal in a pulse shape, since the bubble growth and contraction can be executed instantaneously and appropriately, ejection of the liquid (ink) can be achieved with the excellent response property, and thus it is more preferable.

As the driving signal with the pulse shape, those disclosed in the specification of the U.S. Pat. No. 4,463,359 and the specification of the U.S. Pat. No. 4,345,262 are suitable. With the conditions disclosed in the specification of the U.S. Pat. No. 4,313,124 of the invention related to the temperature rise ratio of the above-mentioned heat functioning surface, the excellent recording can be executed.

As to the recording head configuration, in addition to the combination configuration of the ejection opening, the liquid channel and the electro-thermal converter as in the above-mentioned specifications (the straight line liquid channel or the right angle liquid channel), the configuration using the specification of the U.S. Pat. No. 4,558,333 and the specification of the U.S. Pat. No. 4,459,600 disclosing the configuration with the heat functioning part disposed in a bent region is also included in the present invention.

Additionally, the present invention is effective also in the configuration based on Japanese Patent Application Laid Open No. 59-123670 disclosing the configuration of having a common slit as the ejecting part of the electro-thermal converters with respect to a plurality of the electro-thermal converters, and the configuration Japanese Patent Application Laid Open No. 59138461 corresponding to the ejecting part with the open hole for absorbing the pressure wave of the thermal energy.

Furthermore, as the recording head of the full line type having a length corresponding to the width of the maximum recording medium to be recorded by the recording apparatus, either the configuration of satisfying the length according to the combination of a plurality of recording heads as disclosed in the above-mentioned specification, or the configuration of a recording head formed integrally can be employed, and the present invention can achieve the above-mentioned effects further effectively.

Additionally, the present invention is effective also in the case of using a replaceable chip type recording head capable of achieving electric connection with the apparatus main body or the ink supply from the apparatus main body by being mounted on the apparatus main body, or a cartridge type recording head with the ink tank provided integrally in the recording head itself.

Moreover, it is preferable to provide recovery means, preliminary auxiliary means, or the like for the recording head as the configuration of the recording apparatus of the present invention for further stabilizing the effect of the present invention. As the specific examples thereof, capping means for the recording head, cleaning means, pressuring or vacuuming means, electro-thermal converter, another heating element, or preliminary heating means as a combination thereof can be presented, and execution of a preliminary ejection mode for executing the ejection other than recording is also effective for stable recording.

Furthermore, not only for the apparatus of the main color recording mode such as black, the present invention is extremely effective for an apparatus of multicolor mode or full color mode by color mixing, using an integrated head or a combination of plural heads.

Although in the embodiments of the present invention described above, the ink is explained as a liquid, the ink can be one that solidifies at a temperature lower than room temperature but softens or liquefies at room temperature, or one being liquid only when the recording signal is applied since it is common for the above explained ink jet system to control the ink temperature in a range of 30° C. or more and 70° C. or less so as to control the ink viscosity at the stable ejection range.

Additionally, the ink that liquefies only by application of the thermal energy can be used in the present invention, for example, an ink actively utilizing the thermal energy for the energy for the phase change of the ink from the solid state to the liquid state to prevent temperature rise, or an ink that solidifies when left standing to prevent the ink evaporation, one liquefies by application of the thermal energy according to the recording signal so as to be ejected as a liquid, but solidifies before landing on the recording medium. In this case, the ink may be provided in a form facing the electro-thermal converter in a state held in a porous sheet recessed part or a through hole as a liquid or a solid matter as disclosed in Japanese Patent Application Laid-Open No.

S54-56847, or Japanese Patent Application Laid-Open No. S60-71260. In this embodiment, the most effective for the above-mentioned inks in one for executing the above-mentioned film boiling method.

Furthermore, the form of the recording apparatus according to the present invention includes a copying unit in combination with a reader, or a facsimile unit having the function of transmission and receipt, as well as an image outputting terminal of an information processing appliance such as a word processor and a computer, provided integrally or independently.

Moreover, the ink of the present invention may be used as a coloring material for a colored pixel of a color filter such as a liquid crystal display panel. The coloring material may be used alone or in combination with another coloring material for the color adjustment. As the method for forming a colored pixel, a production method of applying an ink on a substrate by the ink jet recording method is preferable, however, it is not limited thereto.

EXAMPLES

Next, with reference to the examples and the comparative examples, the present invention will be explained more specifically. In the description, the part and % are based on the mass unless otherwise specified.

Example 1

Ink Composition

| | |
|---|---|
| Coloring material of the compound (A) (water-soluble fluorescent coloring material | 0.05% |
| Glycerol | 10% |
| Triethylene glycol | 10% |
| N + m = 10 in the compound of the formula (III) | 0.5% |
| Pure water | the rest |

Example 2

Ink Composition
The content of the coloring material compound (A) in Example 1 was changed to 0.5%.

Example 3

Ink Composition
The content of the coloring material compound (A) in Example 1 was changed to 1.0%.

Example 4

Ink Composition
The content of the coloring material compound (A) in Example 1 was changed to 2.0%.

Comparative Example 1

Ink Composition

| | |
|---|---|
| C.I. Acid Yellow 73 (water-soluble fluorescent coloring material) | 0.05% |
| Glycerol | 10% |
| Triethylene glycol | 10% |
| N + m = 10 in the compound of the formula (III) | 0.5% |
| Pure water | the rest |

Comparative Example 2

Ink Composition
The water-soluble fluorescent coloring material content in Comparative Example 1 was changed to 0.5%.

Comparative Example 3

Ink Composition
The water-soluble fluorescent coloring material content in Comparative Example 1 was changed to 1.0%.

Comparative Example 4

Ink Composition
The water-soluble fluorescent coloring material content in Comparative Example 1 was changed to 2.0%.

Comparative Example 5

Ink Composition
The water-soluble fluorescent coloring material in Comparative Example 1 was changed to C. I. Solvent Green 7, and the content is changed to 2.0%.

<Evaluation>

(Fluorescent Property Evaluation)
The inks of Examples 1 to 3 and Comparative Examples 1 to 3 were left under the 60° C. environment to evaporating water in the ink until a substantially constant weight was reached. Then the fluorescent intensity was measured by irradiating light of 254 nm excitation wavelength using a commercially available fluorescent measuring apparatus FP-750 (produced by JASCO). The obtained results are shown in FIGS. 1 and 2.

Figure 2:
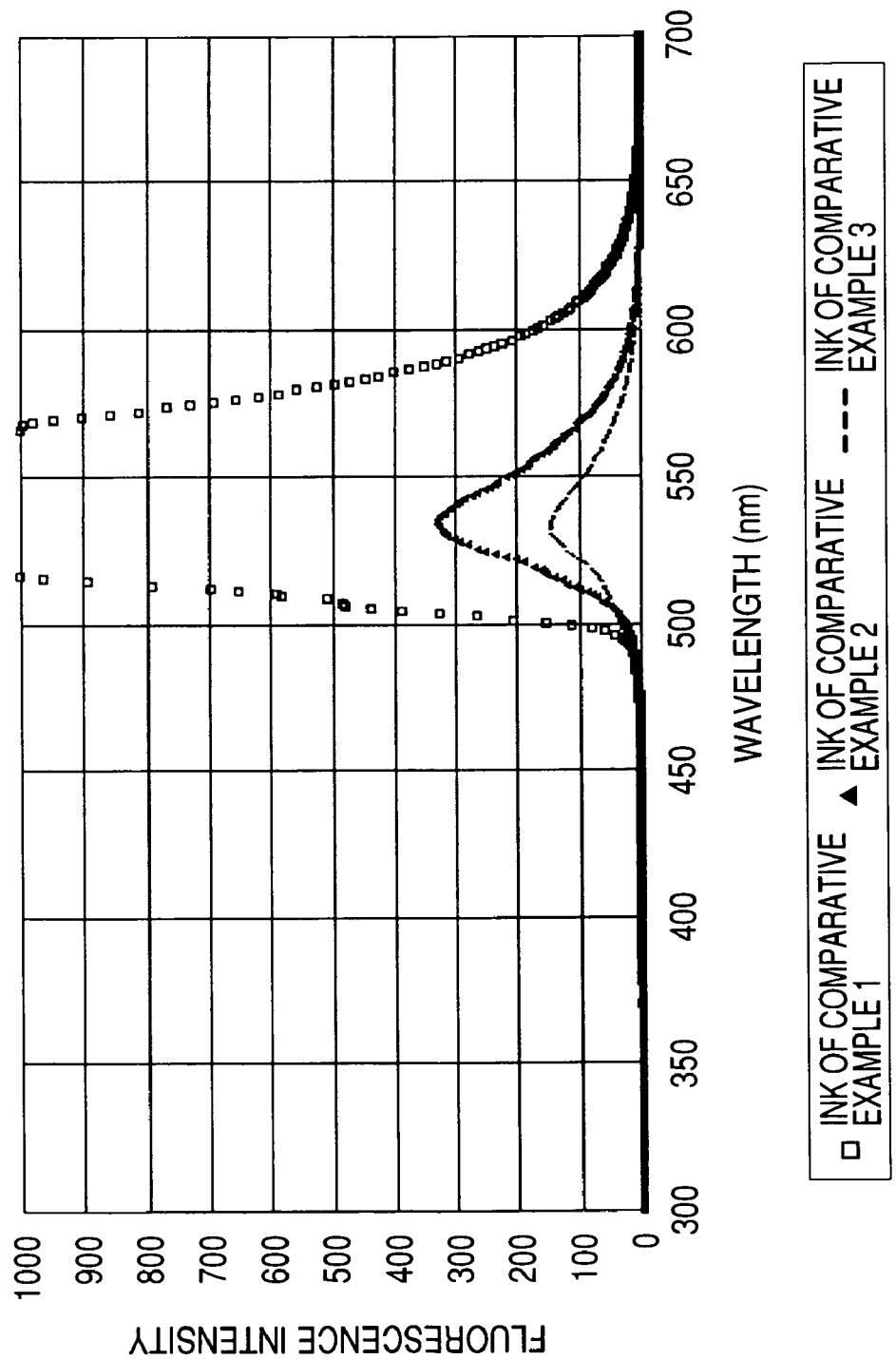
FIG. 2 is a graph showing the fluorescence intensity when inks of Comparative Examples 1 to 3 left at 60° C. are excited at an excitation wavelength of 254 nm.

As the comparison between FIG. 1 and FIG. 2 shows, the inks of Examples have the stable fluorescent intensity even when the content of the fluorescent coloring material in the ink is increased compared with the inks of Comparative Examples.

(Water Resistance Evaluation)
The inks of Examples and Comparative Examples were loaded in a commercially available ink jet recording apparatus BJS600 (Canon) for printing alphanumerals, and a solid image of 50% duty on a commercially available bond paper. After leaving for one day after the printing operation, it was soaked in tap water for 5 minutes.

The inks of Examples 1 to 3: Even after soaking in tap water, the readability of the alphanumerals was not changed significantly compared with the state before soaking. Moreover, the density residual rate of the 50% duty solid print was 80% or more in all cases.

The inks of Comparative Examples 1 to 3: By soaking in tap water, the alphanumerals became hardly readable. Moreover, the density residual rate of the 50% duty solid print was 50% or less in all cases.

Figure 3:
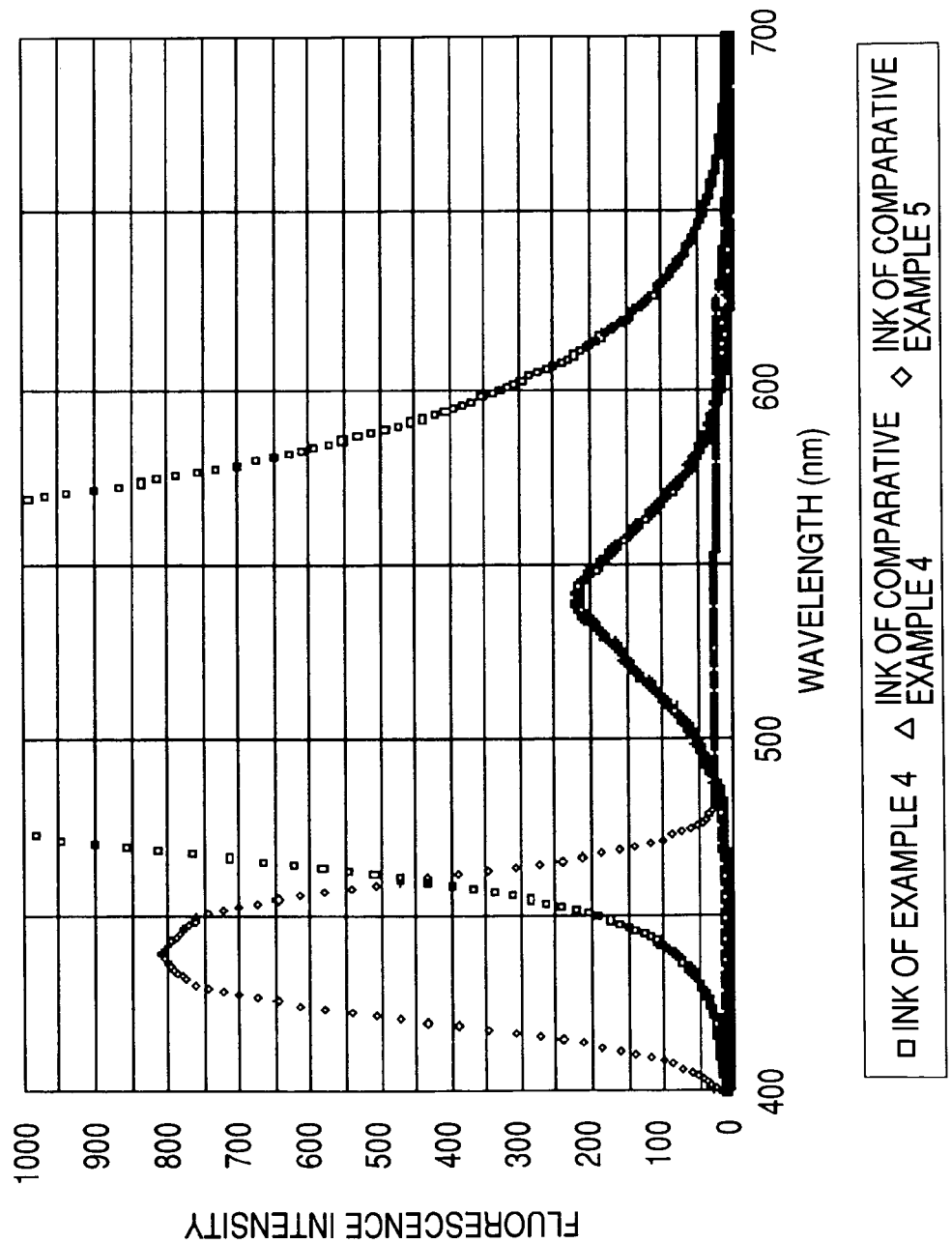
FIG. 3 is a graph showing the fluorescence intensity when printed images with inks of Example 4 and Comparative Examples 4 and 5 are excited at an excitation wavelength of 254 nm.

Fluorescent Property Evaluation on the Recording Material (1)
The inks of Example 4 and Comparative Examples 4 and 5 were loaded in a commercially available ink jet recording apparatus BJS600 for printing a solid image of 50% duty on a commercially available Kraft paper. After leaving for one day in the 60° C. environment after printing, the fluorescent intensity was measured by irradiating light of 254 nm excitation wavelength using a commercially available fluorescent measuring device FP-750 (produced by JASCO). The obtained results are shown in FIG. 3.

The ink of Example 4 showed an remarkably high fluorescent intensity compared with the inks of Comparative Examples.

Conventionally, the content of a fluorescent coloring material in the ink cannot be increased owing to decrease in fluorescent intensity (concentration quenching). According to the present invention, the content of the fluorescent coloring material can be increased to increase fluorescent intensity or another fluorescent coloring material or a non-fluorescent coloring material can coexist in the ink without causing decrease in fluorescent intensity, and furthermore, the high fluorescent intensity of the recorded image on the recording material can be obtained. Moreover, the water resistance of the recorded image can be improved. Furthermore, when the ink of the present invention is used for an ink jet recording printer, no problem occurs in view of clogging of the nozzle for ejecting the ink droplets and the ejecting property so that a printing and recording operation can be executed preferably. Moreover, the ink of the present invention has also a good sticking resistance.

This application claims priority from Japanese Patent Application No. 2003-127617 filed on May 2, 2003, which is hereby incorporated by reference herein.

What is claimed is:

1. A water-based fluorescent ink comprising water, a coloring material that dissolves or disperses in water, and an organic solvent, wherein the coloring material has in one molecule a plurality of fluorescent groups and a sulfonic acid group as a water-soluble group in the state of a free acid and is capable of emitting a fluorescence in a visible light region by irradiation of an ultraviolet light.

2. The water-based fluorescent ink according to claim 1, wherein the coloring material is a hardly water-soluble coloring material.

3. The water-based fluorescent ink according to claim 2, wherein the hardly water-soluble coloring material has a solubility in water less than 3% by mass.

4. The water-based fluorescent ink according to claim 1, wherein the coloring material has a substantivity property with a cellulose fiber.

5. The water-based fluorescent ink according to claim 1, wherein the plurality of the fluorescent groups of the coloring material are of one kind.

6. The water-based fluorescent ink according to claim 1, wherein the plurality of the fluorescent groups are linked via a linking group.

7. A water-based fluorescent ink comprising water, a coloring material that dissolves or disperses in water, and an organic solvent, wherein the coloring material has in one molecule a plurality of fluorescent groups and a sulfonic acid group as a water-soluble group in the state of a free acid and is capable of emitting a fluorescence in a visible light region by irradiation of an ultraviolet light, and wherein the ink is visible under an ordinary light in a visible light region.

8. The water-based fluorescent ink according to claim 7, wherein the coloring material has a solubility in water less than 3% by mass.

9. The water-based fluorescent ink according to claim 7, wherein the coloring material has a substantivity property with a cellulose fiber.

10. The water-based fluorescent ink according to claim 7, wherein the plurality of the fluorescent groups of the coloring material are of one kind.

11. The water-based fluorescent ink according to claim 7, wherein the plurality of the fluorescent groups are linked via a linking group.

12. The water-based fluorescent ink according to claim 1, wherein the coloring material has two fluorescent groups and the two fluorescent groups are the same.

13. The water-based fluorescent ink according to claim 1, wherein the coloring material is a compound represented by the following structural formula Compound (A):

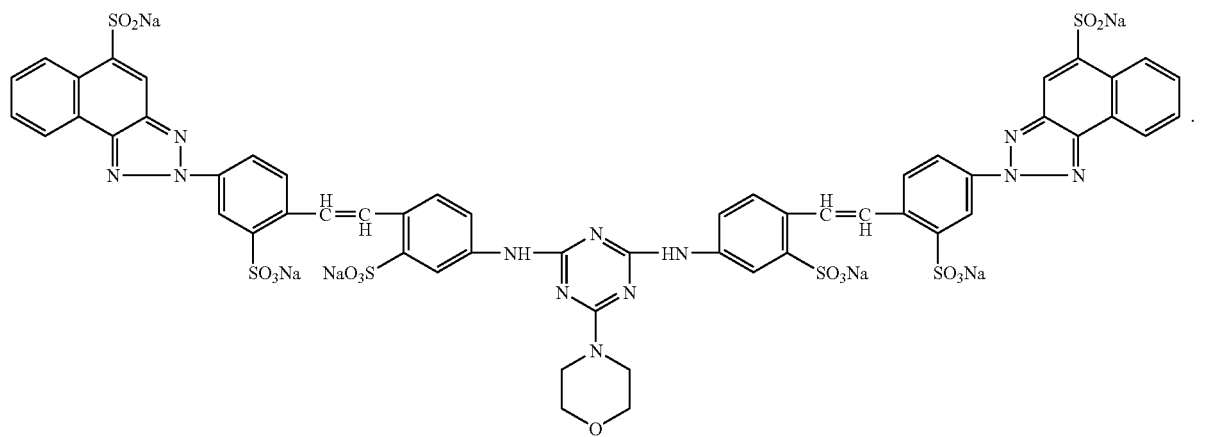

(A)

14. The water-based fluorescent ink according to claim 7, wherein the coloring material has two fluorescent groups and the two fluorescent groups are the same.
15. The water-based fluorescent ink according to claim 7, wherein the coloring material is a compound represented by the following structural formula Compound (A):
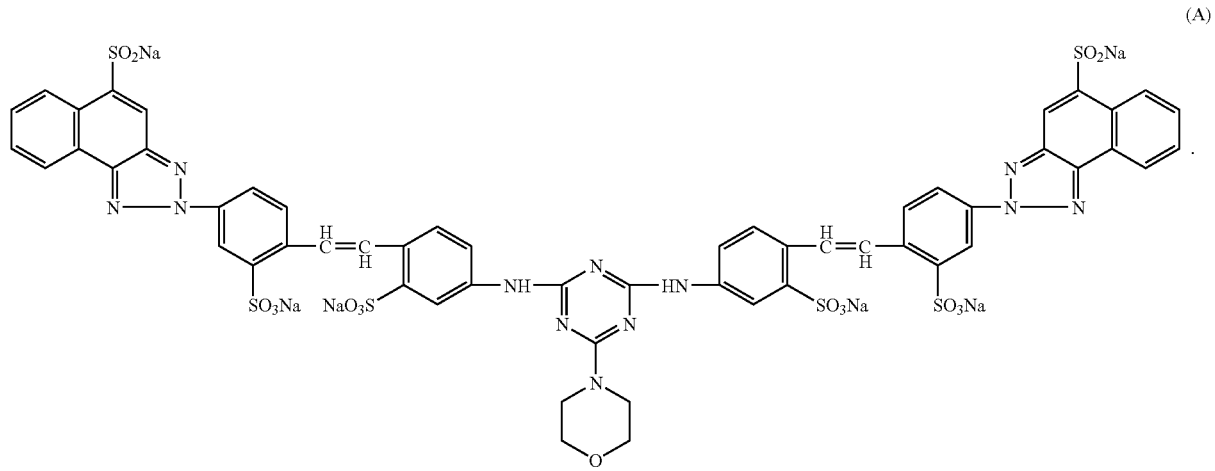
* * * * *

UNITED STATES PATENT AND TRADEMARK OFFICE
CERTIFICATE OF CORRECTION

PATENT NO. : 7,141,105 B2 Page 1 of 1
APPLICATION NO. : 10/975396
DATED : November 28, 2006
INVENTOR(S) : Masako Udagawa et al.

It is certified that error appears in the above-identified patent and that said Letters Patent is hereby corrected as shown below:

COLUMN 9:
Line 17, "black" should read --Black-- and "direct" should read --Direct--.
Line 34, "black" should read --Black--.

COLUMN 11:
Line 30, "represent" should read --represents--.
Line 37, "group.]" should read --group.--.

COLUMN 14:
Line 47, "group.]" should read --group.--.

COLUMN 22:
Line 11, "59138461" should read --59-138461--.

Signed and Sealed this

Sixth Day of November, 2007

JON W. DUDAS
*Director of the United States Patent and Trademark Office*